Jan. 5, 1926.
W. DARGUE
BELT FASTENER
Filed March 10, 1925
1,568,443
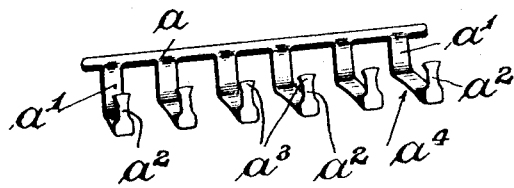
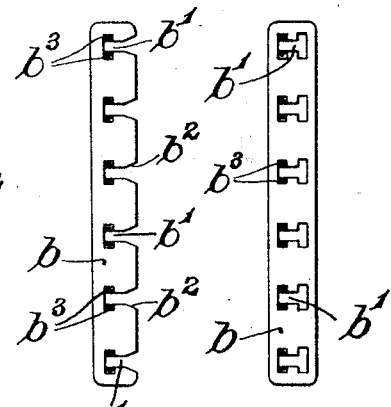
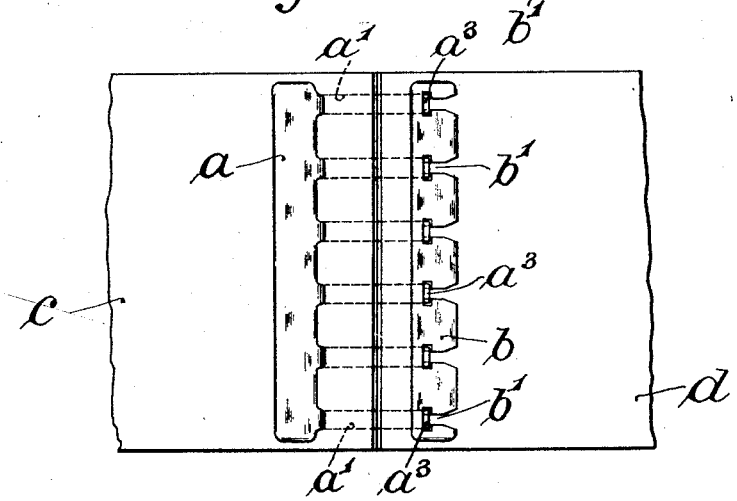
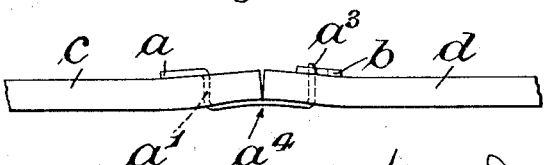

Patented Jan. 5, 1926.

1,568,443

UNITED STATES PATENT OFFICE.

WALTER DARGUE, OF HALIFAX, ENGLAND, ASSIGNOR OF ONE-HALF TO JAMES EDWARD CARTER AND SAM AYRTON WRIGHT, BOTH OF HALIFAX, ENGLAND.

BELT FASTENER.

Application filed March 10, 1925. Serial No. 14,528.

*To all whom it may concern:*

Be it known that I, WALTER DARGUE, a subject of King George V of Great Britain, residing at Halifax, in the county of York, England, have invented a new and useful Improvement in Belt Fasteners, of which the following is a specification.

The invention relates to fasteners for joining the ends of leather or other kinds of driving belts, and has for its object to provide an improved construction of fastener which, in the event of its being desired to shorten the belt, can be easily and quickly removed and as easily and quickly re-applied, and which will present no dangerous projections upon the face of the belt.

According to the invention I employ a metal or other suitable plate or bar having a series of projections or tines bent more or less at right angles in three places so that they form as it were a series of substantially U-shaped members connected at one end by a plate or bar. The end portions of the tines are reduced somewhat in width as will be afterwards made clear, so as to leave the extremities in the form of enlargements or button heads. In combination with the tined bar mentioned I also employ a locking plate having a series of slots through which the reduced portions of the tines can pass, such slots being formed at their inner ends with recesses in which the button heads or enlarged ends of the tines can engage. The construction of the improved fastener, and the mode of its application, will be described with reference to the accompanying drawing, in which:—

Fig. 1 is a perspective view of the tined bar or plate;

Fig. 2 is a plan view of the locking plate;

Figs. 3 and 4 are, respectively, plan and edge views of the two ends of a belt with the fastener applied; and Fig. 5 shows a modified form of locking plate.

In the drawing, a bar or plate $a$ is shewn as having six projections or tines $a'$. The number and spacing of the tines will, of course, vary according to requirements. The tines are bent, as shewn in Figs. 1 and 4, into substantially U-form, and towards their extremities are reduced in thickness as at $a^2$ so as to leave enlarged or button heads $a^3$, the undersides of which are preferably bevelled or inclined.

The locking member comprises, in the form shewn in Fig. 2, a bar or plate $b$ having in one edge a series of open-ended slots $b'$ corresponding in number and spacing to the tines $a'$ and of a width to admit of the passage of the reduced portions $a^2$ of the tines. The mouths of these slots may be flared as at $b^2$ and at their inner ends the slots are provided, on one side of the plate, with recesses or countersunk portions $b^3$ to receive the heads $a^3$ of the tines. The form or construction of the locking plate might be varied by closing the outer ends of the slots and enlarging them sufficiently to admit of the passage of the heads of the tines as shewn in Fig. 5.

The ends of the belt are each punched with a series of holes corresponding in number and spacing to the tines $a'$, the holes being just sufficiently large to permit of the tines passing through them.

In applying the fastener, the tines are passed through the holes in one end $c$ of the belt so that the plate or bar rests upon the outer surface of the belt as shewn in Figs. 3 and 4. The bent ends of the tines are then passed up through the holes in the other end $d$ of the belt and the slotted locking plate $b$ is slipped edgewise in the plane thereof on the belt beneath the heads $a^3$ and so that the heads engage in the countersunk or inclined recesses $b^3$.

The central portions of the tines are preferably curved as shewn at $a^4$ in Fig. 4, in order that they may lay nicely around the surface of a pulley.

It will be observed that the plates $a$ and $b$ lie snugly against the outer surfaces of the belt ends, and no projections are afforded such as are likely to catch the clothing or hands of operatives. When in use, the pull on the belt retains the plates in these positions, and it is impossible for the locking plate to become accidentally detached.

If a belt requires shortening, the plate $b$ can be removed and the tines withdrawn from the holes in the belt end $d$, the necessary amount cut off and new holes punched, the tines replaced and the locking plate re-applied with a minimum expenditure of time and labour.

Having thus described my invention, what I claim as new and desire to secure by Letters Patent is:—

1. A belt fastener comprising a bar having a tine to extend through the two belt ends and provided with an enlargement, in combination with a plate having a slot to receive said tine when the plate is slid on the belt in the plane of the plate, and having a recess to receive said enlargement to prevent withdrawal of the tine from the plate and to prevent removal of the plate from the tine unless the enlargement is disengaged from said recess.

2. A fastener for connecting two belt ends comprising a bar adapted to rest on the surface of one belt end and having a series of tines bent downwardly to extend through openings in said belt end and upwardly to extend through openings in the other belt end with enlargements on the extremities of said tines, in combination with a locking plate adapted to rest on the surface of said other belt end and having slots to receive the upwardly projecting portions of the tines, said slots being recessed at their inner ends to receive said enlargements on and prevent the withdrawal of said tines from the locking plate.

3. A fastener according to claim 2 in which the outer ends of the slots in the locking plate are enlarged to permit of the passage of the enlarged extremities of the tines.

In testimony whereof I affix my signature.

WALTER DARGUE.